United States Patent [19]

Hirota

[11] Patent Number: 4,820,978
[45] Date of Patent: Apr. 11, 1989

[54] MAGNETIC ROTATION SENSOR WHEREIN A MAGNETIC MEMBER IS ATTACHED TO A ROTATION SHAFT BY A HEAT RESISTANT ELASTIC MEMBER

[75] Inventor: Masaki Hirota, Shizuoka, Japan
[73] Assignee: Yazaki Corporation, Japan
[21] Appl. No.: 55,254
[22] Filed: May 29, 1987
[30] Foreign Application Priority Data
  May 30, 1986 [JP] Japan .................. 61-81169[U]
[51] Int. Cl.⁴ .................. G01P 3/48; F16B 4/00
[52] U.S. Cl. .................. 324/166; 324/173; 403/273
[58] Field of Search .............. 324/166, 173, 174, 208; 310/43, 45, 44; 403/225, 226, 228, 265, 267, 273, 282, 365, 372

[56] References Cited

U.S. PATENT DOCUMENTS 3,786,336  1/1974  Lohr .................. 324/174 X
4,256,348  3/1981  Lester et al. .......... 403/273 X
4,321,495  3/1982  Kennedy ............... 324/174 X
4,631,973 12/1986  Eley .................. 403/273 X Primary Examiner—Reinhard J. Eisenzopf
Assistant Examiner—Jack B. Harvey
Attorney, Agent, or Firm—Wigman & Cohen

[57] ABSTRACT

A rotation sensor for vehicle includes a drive shaft connected to a rotation shaft of a vehicle by a transmission member, a ring-shaped magnet member provided onto the drive shaft and a detector for detecting change of magnetic flux caused by rotations of the magnetic member, wherein rotation frequency or rotation speed can be measured by detecting the changes of the magnetic flux. The magnetic member is formed of a composition of heat resisting resin and magnetic materials, and the formed magnetic member is fixed to the drive shaft through a heat resistant elastic member. As a result, even if the rotation sensor is located in high temperature place, e.g. around an engine, there is no possibility that a crack in the magnet member will be caused since expansion or contraction in the magnetic member can be absorbed by the elastic member.

22 Claims, 3 Drawing Sheets

MAGNETIC ROTATION SENSOR WHEREIN A MAGNETIC MEMBER IS ATTACHED TO A ROTATION SHAFT BY A HEAT RESISTANT ELASTIC MEMBER

BACKGROUND OF THE INVENTION

1. Field of the Invention

This invention relates to a rotation sensor for vehicles, and more particularly to a rotation sensor for vehicles used for a speed meter, a tachometer or a trip meter, or the like.

2. Description of the Prior Art

A conventional rotation sensor for vehicles has such a construction as described in FIG. 1, which shows the construction around a drive shaft of the sensor.

In the drawing, the numeral 1 is a housing of the sensor which has a cylindrical bore 2 to which a drive shaft 5 is inserted and an enlarged cylindrical portion 3 formed in the bore 2. A pair of bearings 4 which support both sides 5a and 5b of the drive shaft 5 rotationally are provided on the edge portions 3a of the enlarged cylindrical portion 3, respectively. The drive shaft 5 is connected to a rotational shaft of an engine or a transmission of a vehicle (not shown) by means of a transmission member 6 which is fixedly connected to a connecting section 5c formed in the drive shaft 5. Said connecting section 5c has, as shown in FIG. 2C, a square shape in cross section which is in tight engagement with an end portion of the transmission member 6 which also has a square shape in cross section fittable to the connecting section, so that the rotational force of the engine or the like is transmitted to the drive shaft 5 securely.

In the middle portion of the drive shaft 5, there is formed a ring-shaped enlarged diameter portion 7 integrally, which is located between the bearings 4. On the outer circumferential surface of the enlarged diameter portion 7, there is provided a circumferential recess 7a, on the other hand there are provided notches 7b on the diametrical opposite sides of the ring-shaped enlarged diameter portion 7, as shown in FIG. 2B.

Around the ring-shaped enlarged diameter portion 7, there is formed a magnetic member 8 by insert molding (insert molding is a name of a process fixing a resin to a part of metal material by extrusion). In this case, by the provisions of the circumferential recess 7a, the fixing force between the ring-shaped enlarged diameter portion 7 and the magnetic member 8 can be secured in the axial direction, and by the notches 7b the fixing force in the rotational direction can be also secured.

Said magnetic member 8 comprises, as shown in FIGS. 1 and 2A, a ring-shaped supporting member 8a of a synthetic resin which has a recess 8b on its outer circumferential surface, and a ring-shaped ferrite magnet 8c magnetized to multipoles which is provided in the recess 8b. Said magnetic member 8 is rotated within the enlarged cylindrical portion 3 in accordance with the rotations of the drive shaft 5.

On the inner circumferential surface of the enlarged cylindrical portion 3 at the opposite position to the ring-shaped ferrite magnet 8c, there is provided a detector 9, such as an induction coil or magnetic sensitive element (e.g. Hall element or magnetic resistance element) and so on, for detecting changes in magnetic flux which is caused by the rotations of the ring-shaped ferrite magnet 8c, thereby the rotational frequency and rotation speed can be measured.

In the meantime, it is required for these rotation sensors to be connected to a rotational shaft of an engine or a transmission with a short transmission member in proximity to the engine or the transmission for obtaining a stability in operation, miniaturizing its size and lightening its weight. However, in the rotation sensor having conventional structure described above, there is a problem that the sensor can not be equipped in proximity to the engine around which a temperature rises more than 130° C., since the ring-shaped supporting member 8a of the magnetic member 8 is insufficient in heat resisting property due to being commonly formed of a synthetic resin such as polyacetal resin or P.B.T. (Polybutylene Terephthalate).

In order to solve the problem, it was proposed to form the magnetic member 8 of a composition of a heat-resisting synthetic resin such as polyphenylene sulfide and ferrite particles, and to attach thus formed magnetic member 8 around the ring-shaped enlarged diameter portion 7 of the drive shaft 5, as shown in FIG. 3. However, although the magnetic member 8 thus formed has a good heat resisting property, it is liable to cause a crack in the magnetic member 8 since the magnetic member 8 is expanded or contracted repeatedly due to changes of a temperature within the extent over 130° C. around the engine.

In order to prevent the occurrence of the crack, it was proposed that a ratio of b/a ("a" is an inner diameter of the magnetic member 8 and "b" is an outer diameter of the magnetic member 8) is set to more than e.g. "b $\geq$ 10a", or heat expansion coefficiency of the synthetic resin contained in the magnetic member 8 is set to equal to that of the materials of the drive shaft 5. However, in the former way, there are disadvantages that a fixing force of the magnetic member 8 to the drive shaft 5 is deteriorated due to decrease of the inner diameter "a" and a size of the magnetic member becomes larger due to enlargement of the outer diameter of the magnetic member 8, while in the later way there is a disadvantage that a cost of the manufacturing is increased due to a price of the synthetic resin being high. In addition, when the magnetic member 8 is formed by insert molding, it is necessary to determine a structure of the die of the magnetic member and a molding condition strictly to prevent an occurrence of a weld line which is one of the factors which causes the crack, so that there is a disadvantage that a manufacturing cost is also increased.

Further, these disadvantages result in a trouble which causes a falling off of the magnetic member from the drive shaft.

SUMMARY OF THE INVENTION

In views of the foregoing problems, this invention has been made. Accordingly, a main object of the present invention is to provide a rotation sensor for vehicles which is superior in heat-resisting property, and enables to lighten its weight and reduce its manufacturing cost.

Another object of the present invention is to provide a rotation sensor for vehicles which can be installed in the high temperature place, e.g. near an engine.

Still another object of the present invention is to provide a rotation sensor for vehicles which can prevent an occurrence of a crack in the magnetic member.

In order to attain the above objects, the rotation sensor for vehicles according to the present invention comprises a drive shaft connected to a rotation shaft of an engine or a transmission or the like of a vehicle by means of a transmission member and a ring-shaped magnetic member provided onto the drive shaft, and a detector for detecting changes of magnetic flux caused by rotations of the magnetic member, wherein rotation frequency or rotation speed can be measured by detecting the changes of magnetic flux, characterized in that said magnetic member is formed of a composition of heat resisting resin and magnetic materials, and thus formed magnetic member is attached to the drive shaft through a heat resistant elastic member.

According to the rotation sensor having such a construction described above, even if the rotation sensor is located in high temperature place, e.g. around an engine, there is no possibility that a crack in the magnet member will be caused since expansion and contraction in the magnetic member can be absorbed by the heat resistant elastic member. Thereby, it is possible to prevent an occurrence of falling off of the magnetic member. Further, it is also possible to produce a rotation sensor of good property with low cost.

These and other objects and advantages of the present invention, as well as the details of an illustrative embodiment, will be more fully understood from the following specification and drawings, in which:

DETAILED DESCRIPTION OF THE PREFERRED EMBODIMENTS

Figure 1:
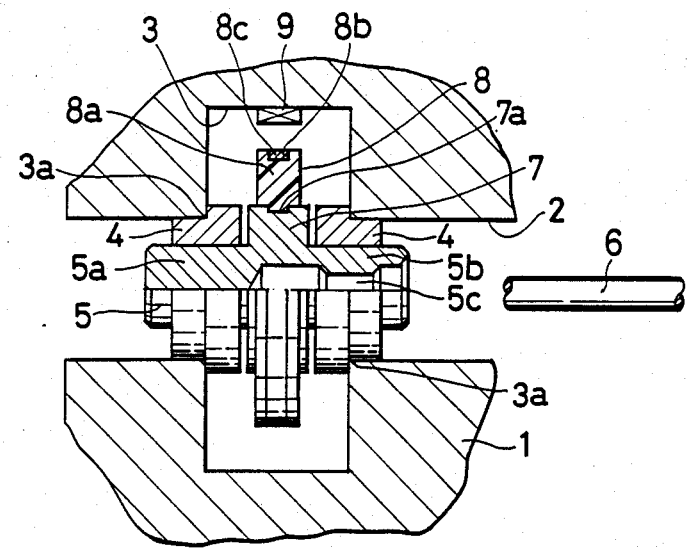
FIG. 1 is a partly sectional view showing a conventional rotation sensor for vehicles.

Hereinafter, referring now to the drawings, detailed description of the preferred embodiments of the present invention will be given.

Figure 3:
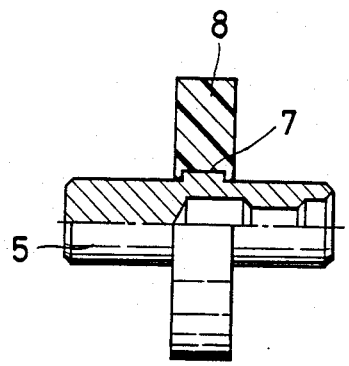
FIG. 3 is a partly sectional front view of a drive shaft of the other conventional rotation sensor for vehicles.
Figure 4:
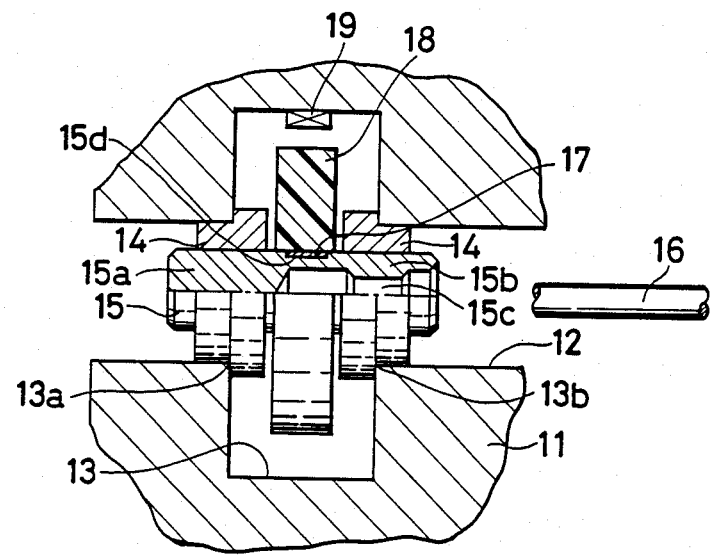
FIG. 4 is a partly sectional front view of one embodiment of a rotation sensor for vehicles according to the present invention.

FIG. 4 shows a sectional view of the first embodiment of the rotation sensor for vehicles according to the present invention. The rotation sensor for vehicles of this embodiment has a substantially same construction as that of the conventional sensor described in FIG. 3 except for the structure of the combination between the drive shaft and magnetic member.

Figure 2A:
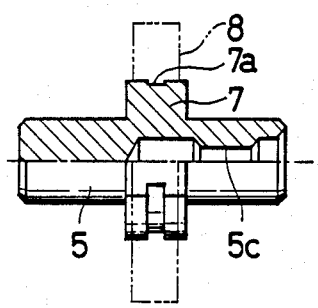
FIG. 2A is a partly sectional front view of a drive shaft of the sensor in FIG. 1.
Figure 2B:
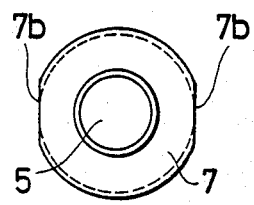
FIG. 2B is a left side view of the drive shaft in FIG. 2A.
Figure 2C:
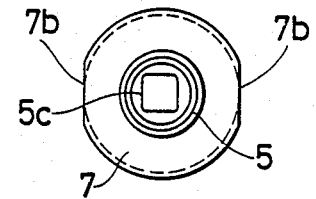
FIG. 2C is a right side view of the drive shaft in FIG. 2A.

Specifically, in the drawing, numeral 11 is a housing of the sensor which has a cylindrical bore 12 to which a drive shaft 15 is inserted and an enlarged cylindrical portion 13 formed in the bore 12. A pair of bearings 14 which support both sides 15a and 15b of the drive shaft 15, rotationally are provided on the edge portions 13a and 13b of the enlarged cylindrical portion 13, respectively. The drive shaft 15 is connected to a rotational shaft of an engine or a transmission of a vehicle (not shown) by means of a transmission member 16 which is fixedly connected to a connecting section 15c formed in the drive shaft 15 on the side of the side portion 15b. Said connecting section 15c has, as shown in FIG. 2C, a square shape in cross section which is in tight engagement with an end portion of the transmission member 16 which also has a square shape in cross section fittable to the connecting section, so that the rotational force of the engine or the like is transmitted to the drive shaft 15 securely.

On the central portion of the drive shaft 15, there are formed a circumferential recess 15d on its outer surface and notches (not shown) at the opposite positions on the outer surface of the drive shaft 15. On the bottom portion of the recess 15d, there are provided a heat resistance elastic body 17, so that a ring-shaped magnetic member 18 is fixed to the drive shaft 15 through the heat resistance elastic body 17. In this case, by the provision of the recess 15d the magnetic member 18 is fixed to the drive shaft 15 dislocationally in the axial direction thereof, and by the notches the magnetic member 8 is fixed secured to the drive shaft nonrotatably, thereby the magnetic member 18 is rotated in accordance with the rotation of the drive shaft 15 securely.

Said ring-shaped magnetic member 18 is formed of a composition of a heat-resisting synthetic resin, such as polyphenylene sulfide, and magnetic materials, such as ferrite particles, in the same manner as the conventional sensor, and fixed to the drive shaft 15 by the insert molding. Specifically, said magnetic member 18 is formed by insert molding of composition made of, for example, a ferrite particle of 80–95 [wt %], polyphenylene resin having heat-resistant property of 5–15 [wt %] and a reinforcing materials of 1–10 [wt %] which is mainly made of glass fiber, composition of glass fiber and phenolic particles or inorganic material such as carbon fiber to the drive shaft 15 in magnetic field. By this process, magnetic anisotropy is given to the magnet member 18, thereby obtaining substantially same magnetic force as the conventional magnetic member which is formed of only ferrite materials. After the magnetic member is mounted to the drive shaft by molding, the magnetic member is magnetized in the circumferential direction so as to have desired number of poles.

Thus formed magnetic member is able to have good heat resistant property due to the property of the polyphenylene sulfide resin as well as sufficient magnetic force as stated above, and further it can be prevented an occurrence of a crack by thermal or mechanical shock.

In addition, on the inner circumferential surface of the enlarged cylindrical portion 13, there is provided a detector 19, such as an induction coil or magnetic sensitive element (e.g. Hall element or magnetic resistance element) and so on, for detecting changes in magnetic flux which is caused by the rotation of the magnetic member 18, thereby the rotational frequency and rotation speed can be measured.

It is preferred that said heat resistance elastic body 17 is formed of e.g. a tube or tape-shaped fluoro resin or silicon resin. Further, in a case where the outer diameter of the drive shaft 15 is set to 6 mm and the outer diameter of the magnetic member 18 is set to 20 mm, it is preferred that the depth of the recess 15d is 0.5 mm and the thickness of the elastic body before the magnetic member 18 is fixed is more than 0.05 mm.

Said elastic body 17 can be attached to the recess 15d of the drive shaft 15 by the following methods. One is the method that a tubular heat resistance elastic body 17 is put on the bottom of the recess 15d formed on the drive shaft 15, and attached to the bottom of the recess 15d by heat shrink. The others are the methods that a tape shaped heat resistance elastic body 17 is wound in the recess 15d and attached to the bottom of the recess 15d by heat shrink, and that a melted materials of the heat resistance elastic body 17 is applied to the bottom of the recess 15d.

After applying the heat resistance elastic body 17 on the bottom of the recess 15d, the magnetic member 18 is attached to the drive shaft 15 by the insert molding. In this case, the shrinked fluoro resin or silicon resin is not liable to be deformed or hardened by heat, thereby it is possible to prevent an occurrence of the crack in the magnetic member 18.

Figure 5:
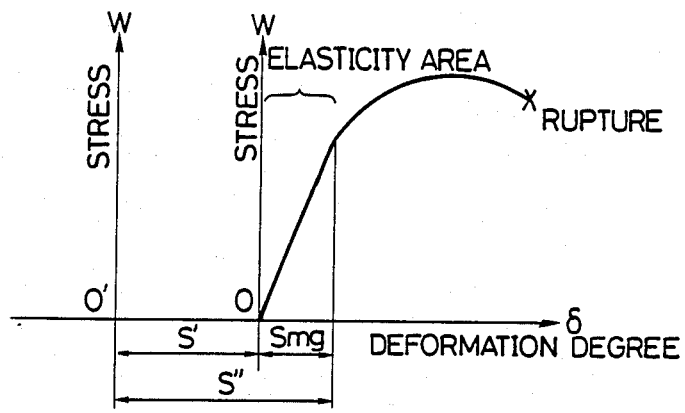
FIG. 5 is a graph which shows the principle of the present invention.

FIG. 5 is a graph explaining a principle of this invention, which shows a relationship between deformation degree δ and stress W. In the drawing, Smg is an allowable deformation degree of the magnetic member 18 and S' is an allowable deformation degree of the elastic body 17.

Namely, in a case where there is no elastic body between the magnetic member 18 and the drive shaft 15, the allowable deformation degree Smg is represented by the following formula;

$$Smg \leq (\alpha mg - \alpha s) \times T \times d$$

In this case,
αmg; thermal expansion coefficient of the magnetic member [/°C.]
αs; thermal expansion coefficiency of the drive shaft [/°C.]
T; temperature [°C.]
d; outer diameter of the drive shaft (which corresponds to the inner diameter of the magnetic member) [mm].

Consequently, in a case where an elastic body 17 is disposed between the magnetic member and the drive shaft, an allowable deformation degree S" is increased in accordance with the following formula;

$$S'' = Smg + S',$$

because elasticity area is extended. Therefore, there is no possibility that a crack is caused since no excessive stress will be caused even if the magnetic member 18 is expanded or contracted within a certain extent by changes of temperature.

Figure 6:
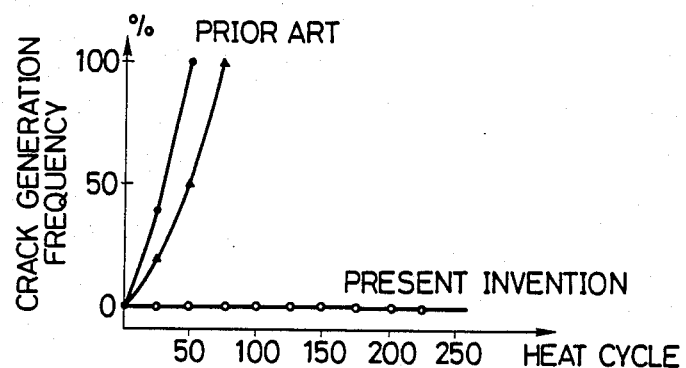
FIG. 6 is a graph which shows the result of heat cycle test of the rotation sensor according to the present invention.

FIG. 6 is a graph showing results of heat cycle tests in the conventional sensor and the sensor of the present invention. These tests are performed under the repeated heat cycles of −40 [° C.]during 60 minutes and 150 [° C.]during 60 minutes, and measured whether or not a crack is caused every prescribed cycles.

From the results of the tests, it can be found that in the conventional magnet member, though difference can be seen according to kinds of composite materials, a crack has been always caused under heat cycles of 100 times, but that in the magnetic member of this embodiment no crack has been caused even more than heat cycles of 200 times. In this case, Teflon tape ("Teflon" is the trademark for polytetrafluorethylene) is used as heat resistance elastic body 17.

Figure 7A:
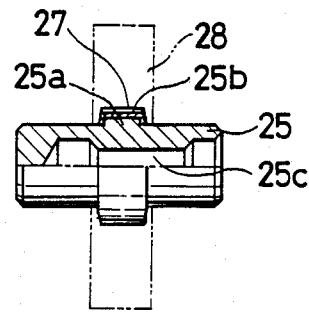
FIG. 7A is a partly sectional front view of the drive shaft of the other embodiment of the present invention.
Figure 7B:
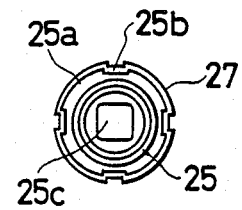
FIG. 7B is a right side view of the drive shaft in FIG. 7.

FIG. 7A shows the other embodiment of the present invention. In this embodiment, a drive shaft 25 has at its central portion a circumferential protruding portion 25a. In addition, four axial notches 25b are formed on the outer circumferential surface of the protruding portion 25a every right angles, as shown in FIG. 7B. In this case, said drive shaft may be formed by the following process. At first, an aperture is formed along the axial direction of the drive shaft 25. Thereafter, on the circumferential portion of the outer surface of the drive shaft 25, there are formed four axial notches 25b at 900 intervals by press working, thereby the inner wall of the aperture being deformed from the four sides, so that a connecting section 25c having a substantially square shape in cross section is obtained therein. After this process, unnecessary portion of the outer surface of the drive shaft 25 is cut off to form the protruding portion 25a, thereby obtaining the drive shaft as shown in FIG. 7 can be obtained.

After this, a magnetic member 28 is fixed to the drive shaft 25 by insert molding through a heat resistance elastic body 27 which is applied onto the protruding portion 25a and notches 25b.

Therefore, since an expansion and a contraction of the magnetic member 28 can be absorbed by the elastic body 27, so that there is no possibility that a crack will be occurred in the magnetic member 28. Further, the magnetic member 28 can be fixed to the drive shaft securely in the rotational direction and the axial direction by the provisions of the axial recesses and the circumferential recess, so that the magnetic member can be rotated in accordance with the rotations of the drive shaft surely.

According to the rotation sensor having such a construction described above, even if the rotation sensor is located in high temperature place, e.g. around an engine, there is no possibility that a crack in the magnet member will be caused.

It must be understood that the invention is in no way limited to the above embodiments and that many changes may be brought therein without departing from the scope of the invention as defined by the appended claims.

What is claimed is:

1. A rotation sensor for a vehicle, comprising:
   a drive shaft connected to a rotation shaft of the vehicle;
   a ring-shaped magnetic member fixed to the drive shaft, the magnetic member being formed from a composition of heat resistant resin and magnetic materials;
   a heat resistant elastic member, which is disposed between the drive shaft and the magnetic member, for absorbing the stress of expansion or contraction of the drive shaft and the magnetic member; and
   a detector for detecting changes of magnetic flux caused by rotation of the magnetic member mounted on said vehicle, wherein angular frequency or angular velocity can be determined from said changes in magnetic flux.

2. A rotation sensor for vehicle as set forth in claim 1, wherein said drive shaft has a circumferential recess, and said heat resistant elastic member is disposed in the recess, and said magnetic member is fixed to the drive shaft by insert molding so as to cover the recess.

3. A rotation sensor for vehicle as set forth in claim 1, wherein a ring-shaped protrusion having a circumferential surface is integrally formed onto the drive shaft, and said heat resistant elastic member is disposed on the circumferential surface, and said magnetic member is fixed to the drive shaft by insert molding so as to cover the protrusion.

4. A rotation sensor for vehicle as set forth in claim 1, wherein said heat resistant elastic member is made of fluoro or silicon resin.

5. A rotation sensor for vehicle as set forth in claim 2, wherein said heat resistant elastic member is made of tube-shaped fluoro resin.

6. A rotation sensor for vehicle as set forth in claim 2, wherein said heat resistant elastic member is made of tape-shaped fluoro resin.

7. A rotation sensor for vehicle as set forth claim 2, wherein said heat resistant elastic member is made of tube-shaped silicon resin.

8. A rotation sensor for vehicle as set forth in claim 2, wherein said heat resistant elastic member is made of tape-silicon resin.

9. A rotation sensor for vehicle as set forth in claim 2, wherein said heat resistant elastic member is applied by heat shrink.

10. A rotation sensor for vehicle as set forth in claim 2, wherein said heat resistant elastic member is formed by applying melted heat resistant elastic material applied on the recess.

11. A rotation sensor for vehicle as set forth in claim 2, wherein said heat resistant elastic member is made of fluoro or silicon resin.

12. A rotation sensor for vehicle as set forth in claim 3, wherein said heat resistant elastic member is made of fluoro or silicon resin.

13. A rotation sensor for vehicle as set forth in claim 3, wherein said heat resistant elastic member is made of tube-shaped fluoro resin.

14. A rotation sensor for vehicle as set forth in claim 3, wherein said heat resistant elastic member is made of tape-shaped fluoro resin.

15. A rotation sensor for vehicle as set forth in claim 3, wherein said heat resistant elastic member is made of tube-shaped silicon resin.

16. A rotation sensor for vehicle as set forth in claim 3, wherein said heat resistant elastic member is made of tape-shaped silicon resin.

17. A rotation sensor for vehicle as set forth in claim 3, wherein said heat resistant elastic member is formed by applying melted heat resistant elastic material applied on the recess.

18. A rotation sensor for vehicle as set forth in claim 3, wherein said heat resistant elastic member is applied by heat shrink.

19. A rotation sensor for vehicle as set forth in claim 4, wherein said heat resistant elastic member is applied by heat shrink.

20. A rotation sensor for vehicle as set forth in claim 5, wherein said heat resistant elastic member is applied by heat shrink.

21. A rotation sensor for vehicle as set forth in claim 6, wherein said heat elastic member is applied by heat shrink.

22. A rotation sensor for vehicle as set forth in claim 7, wherein said heat resistant elastic member is applied by heat shrink.

* * * * *